United States Patent [19]

Stefán et al.

[11] 4,368,221
[45] Jan. 11, 1983

[54] PROCESS FOR COATING FIBROUS GLASS WITH AMORPHOUS NICKEL PHOSPHOROUS GLASS METAL

[75] Inventors: Mihály Stefán; Zoltán Hegedüs; Terézia Bági née Schmidt, all of Budapest; Henrik Dörner; Miklós Kanyó, both of Kecskemét; Pál Füzesi, Budapest, all of Hungary

[73] Assignees: Bács Megyei Állami Épitöipari Vállalat, Kecskemét; Csepel Müvek Tervezö és Kutató Intézete, Budapest, both of Hungary

[21] Appl. No.: 278,608

[22] Filed: Jun. 29, 1981

[30] Foreign Application Priority Data

Jul. 4, 1980 [HU] Hungary .............................. 1677/80

[51] Int. Cl.$^3$ ................................................ C23C 3/02
[52] U.S. Cl. .................................... 427/305; 427/306; 427/443.1; 427/307; 106/1.27
[58] Field of Search ............ 427/305, 306, 438, 443.1, 427/307; 106/1.27

[56] References Cited

U.S. PATENT DOCUMENTS

| | | | |
|---|---|---|---|
| 2,690,402 | 9/1954 | Crehan | 427/305 |
| 3,060,059 | 10/1962 | Sickles | 427/438 |
| 3,476,594 | 11/1969 | Söderberg | 427/108 |
| 3,686,020 | 8/1972 | Colt-Palagos | 427/309 |
| 4,086,128 | 4/1978 | Sugio | 427/306 |

FOREIGN PATENT DOCUMENTS 46-12881  4/1971  Japan .................................. 427/305
1094318  12/1967  United Kingdom .
1175348  12/1969  United Kingdom .

OTHER PUBLICATIONS

Vetrotex International, (Brochure, p. 4), ©1975, Geneva, Switzerland.
"Metallic Glasses", by American Society for Metals, (1978).
Wein, "Nickel and Cobalt Films," The Glass Industry, Sep. 1959, pp. 476, 477, 498, 500–502.

Primary Examiner—John D. Smith
Attorney, Agent, or Firm—Gabriel P. Katona

[57] ABSTRACT

The invention relates to a process for coating fibrous glass with a glass metal mainly consisting of nickel-phosphorus, under conditions free of current. According to the process a fibrous glass substrate is treated with an aliphatic alcohol having 1 to 4 carbon atoms and subsequently with an aqueous solution of $SnCl_2$, in the presence of hydrochloric acid, and is then activated with a solution of palladium chloride in aqueous hydrochloric acid. Thereafter the pretreated and activated substrate is kept in a bath comprising nickel ammonium sulfate or nickel sulfate and nickel ammonium sulfate as a nickel-containing component, in combination with sodium hypophosphite, an alkali metal salt of at least one organic acid having a low molecular weight, a mineral acid, preferably sulfuric acid or hydrochloric acid in an amount sufficient to adjust the pH to 3 to 4, and optionally organic or inorganic metal-deposition regulating agent(s) at a temperature between 50° to 90° C.

9 Claims, No Drawings

PROCESS FOR COATING FIBROUS GLASS WITH AMORPHOUS NICKEL PHOSPHOROUS GLASS METAL

BACKGROUND

The invention relates to a process for coating fibrous glass with glass metal. More particularly, the invention concerns a method by which a glass metal coating can be applied to a fibrous glass electrochemically, under conditions free of current. The amorphous glass metal coating inhibits the corrosion of the fibrous glass in an alkaline medium and improves its mechanical properties.

The term "fibrous glass" as used throughout the specification and claims includes glass-cloth, glass-staple and glass-quilt.

Fibrous glasses are widely used for reinforcing synthetic materials. By incorporating a highly elastic fibrous glass, which has a high breaking strength, into a synthetic material, products with excellent mechanical properties can be obtained. Under alkaline conditions, however, the fibrous glass is strongly deteriorated causing the reinforcing effect of the fibers entirely cease within a relatively short time. Therefore such glass fibers cannot be used for reinforcing cement-bonded products.

Cement-bonded products reinforced with fibrous glass can for example be used in aboveground constructions, e.g. for manufacturing front panels, steady frameworks, false ceilings; and in civil engineering uses, for example, for covering underground pipe-lines, manufacturing pile-planks and small constructive works. Alkali-resistant fibrous glasses can be employed for producing so-called glass cement products. Alkali-resistant fibrous glasses are rather expensive and after a certain time their reinforcing effect decreases rapidly. Generally the breaking strength of glass cement products decreases to half of its original value within 10 years.

A method of producing metal coatings on the surface of objects made of synthetic materials is disclosed in British patent specification No. 1,175,348. According to this patent a nickel alloy is deposited from an aqueous solution onto the surface of synthetic materials and then a copper or chromium coating is applied to the nickel alloy layer by conventional electrolytic techniques.

Further methods of producing nickel coatings on glass surface are disclosed in British patent specification No. 1,094,318 and in U.S. Pat. Nos. 3,476,594 and 3,686,020. Before coating, the glass surface is etched with an aqueous solution of hydrogen fluoride or a mixture of hydrogen fluoride and chromium trioxide. The pretreated, rough glass surface is then treated in an aqueous bath containing nickel sulfate and sodium hypophosphite or nickel fluoroborate, nickel sulfate and sodium hypophosphite and optionally further additives. In this way a crystalline nickel-phosphorus coating is formed on the glass surface. According to this method highly corrosive chemicals are used for treating the glass surface before coating and the quality of the metal coatings formed is not always satisfactory.

Glass metals, e.g. amorphous nickel, can be formed on metal surfaces by the so called Kanigen method ("Catalytic Nickel Generation," General American Transportation Corporation; see e.g. Gépgyártástechnológia, November 1975). This method can, however, be employed for coating glass surfaces only after a careful chemical and catalytic pre-treatment of the substrate.

It can generally be established that the deposition of nickel or other similar glass metal coatings on metals from baths containing a catalyst as a promotor and a stabilizator, under conditions free of current, is initiated by the metal to be coated. Under different conditions a metal, e.g. nickel layer, is precipitated not only on the substrate to be coated but also on the walls of the containers, pipe-lines, pumps, heating system, etc. and therefore the coating bath is inactivated rapidly.

BRIEF DESCRIPTION OF THE INVENTION

The invention relates to a non-destructive process for coating fibrous glasses by glass metals, which protect the substrate from corrosion and improve its mechanical properties. The coating is prepared electromechanically, under current-free conditions. The method is simple, economic and the coated fibrous glass can successfully be employed for reinforcing cement products.

DETAILED DESCRIPTION OF THE INVENTION

According to the invention the substrate is treated with an aliphatic alcohol having 1 to 4 carbon atoms and subsequently with an aqueous solution of $SnCl_2$ in the presence of hydrochloric acid. The substrate is then activated with a solution of palladium chloride in aqueous hydrochloric acid. It is thereafter placed in a bath comprising as the nickel containing component, nickel ammonium sulfate or a mixture of sulfate and nickel ammonium sulfate, in combination with sodium hypophosphite, an alkali metal salt of at least one organic acid having a low molecular weight, a mineral acid, preferably sulfuric acid or hydrochloric acid in an amount sufficient to adjust the pH to 3 to 4, and optionally organic or inorganic metal deposition regulating agent(s), at a temperature between 50° C. and 90° C.

As the aliphatic alcohol having 1 to 4 carbon atoms preferably methanol or ethanol is used in an aqueous solution containing up to 20% by vol. of water. The $SnCl_2$ solution contains 0.1 to 0.5 g./lit. of $SnCl_2$ and 0 to 2.0% by weight of a 35% aqueous solution of hydrochloric acid. The aqueous palladium chloride solution used for activation contains 0.005 to 0.5% by weight of palladium chloride in the presence of hydrochloric acid. The treatment with alcohol and $SnCl_2$ is preferably carried out at room temperature (at most 30° C.).

A typical bath used for producing the required nickel-phosphorus amorphous layer contains the following ingredients:

$Ni(NH_4)_2(SO_4)_2 \cdot 6H_2O$—15 to 30 g./lit.
sodium citrate—10 to 100 g./lit.
sodium acetate—10 to 100 g./lit.
sodium hypophosphite—10 to 80 g./lit.
sulfuric acid (specific weight: 1.84)—15 to 30 cm$^3$./lit.

The bath can optionally contain one or more of the following elements: Co, Cu, Fe, Sn, Pd, Cl, S. If the concentration of Cu is kept below 1 g./lit., the concentration of C is below 1% while the other components are added in a concentration not exceeding 1%, the formation and quality of the Ni-P coating is not harmfully influenced by their presence. The pH of the solution is adjusted to 3 to 4. The coating is formed at a temperature of 55° to 70° C. in 1 to 45 minutes. The bath can optionally contain maleic acid or benzenesulfonimide salts, benzenesulfonic acid sodium or a copper, molybdenum or other metal salt as a stabilizer.

The coatings prepared according to the invention have an amorphous structure and are typical nickel-phosphorus glass metals. The glass metal applied to the fibrous glass improves its mechanical properties.

The product prepared according to the invention can be used for the manufacture of cement-like products reinforced with fibrous glass materials. The strength of such products reinforced with uncoated fibrous glass strongly decreases, generally due to hydration. The fibrous glass is fixed rigidly and on deformation breaking and shearing may take place. The use of a glass metal coating eliminates these problems since the fibrous glass coated with a glass metal is fixed in the material less rigidly and in addition, becomes much more resistant against alkaline reactants. The strength of cement products reinforced with a fibrous glass with a glass metal coating according to the invention decreases much slower and therefore these products are extremely suited for manufacturing various frameworks. The alkali-resistance of the fibrous glasses coated with a glass metal according to the invention was verified by cement water corrosion tests. Following the method disclosed in the present invention the required coatings can be produced economically, with a low energy consumption.

We have surprisingly found that the glass substrate to be coated need not be pretreated with hydrogen fluoride or chromium trioxide prior to coating, since on the polar, hydrophylic glass surface an oriented absorption of polar organic molecules, e.g. alcohols takes place. Absorption changes the quality of the surface, on which glass metal coatings can be formed without previous etching. The combination of the pretreatment with an alchol, a subsequent activation and the treatment in a bath containing the required components in an appropriate concentration results in the formation of glass metal coatings of excellent quality. The glass metal obtained contains 4 to 15% of phosphorus and optionally one or more of the following elements: Cu, Co, Fe, Sn, Pd, Cl, S, C.

Further details of our invention are illustrated in the following Examples but it is not intended to limit the scope of the invention to the Examples.

Reference Example I

The fibrous glass to be treated is wetted in a 80% aqueous ethanol solution at 20° C. for 2 minutes. Wetting can be performed by dipping the fibrous glass into an alcoholic bath or by pulling it through an alcoholic bath. The excess ethanol is allowed to trickle down from the glass surface, whereupon the glass is dipped into a bath with the following composition at 20° C. for 3 minutes:
$SnCl_2$—5 g./lit.
35% hydrochloric acid—15 cm$^3$./lit.
water—up to 1000 cm$^3$.

The glass is then rinsed and is kept in the following solution at 90° C. for 3 minutes, without previous drying:
$NiSO_4.6H_2O$—15 g./lit.
$NaH_2PO_2.H_2O$—15 g./lit.
$H_2SO_4$ (specific weight: 1.84)—4 cm$^3$.
sodium acetate.3 $H_2O$—60 g.
water—up to 1000 cm$^3$.
The pH of the bath is 4.5, the deposition rate amounts to 10 $\mu$m/hour at 90° C.

Alkali resistance was tested by the following (internationally accepted) method:
Portland cement is admixed with water and the mixture is shaken for 14 hours, whereupon it is filtered. The cement to water weight ratio is adjusted to 1:10. Corrosion is tested on 2 g. of fibrous glass, previously dipped into 300 ml. of a solution prepared as described above. The solution is kept at 90° C. and after 18 hours the loss in weight is determined and the percentage loss is calculated. Loss in weight: 18%.

REFERENCE EXAMPLE II

The procedure described in Example I is followed except that nickel sulfate is replaced by a 15 g./lit. solution of $NiCl_2.6H_2O$ and instead of sulfuric acid 30 cm$^3$. of a 35% hydrochloric acid solution is employed. The pH of the bath is 4.
Deposition rate at 90° C.: 20 $\mu$m./hour.
Loss in weight in the alkali resistance test: 23%.

EXAMPLE 1

The fibrous glass is pretreated as described in Reference Example I and is then kept in the following bath at 60° C. for 2 minutes:
$Ni(NH_4)_2(SO_4)_2.6H_2O$—15 g./lit.
sodium citrate.5$H_2O$—15 g./lit.
sodium acetate.3$H_2O$—15 g./lit.
$NaH_2PO_2.H_2O$—10 g./lit.
sulfuric acid (specific weight: 1.84)—7.5 cm$^3$./lit.
water—up to 1000 cm$^3$.
The bath has a pH of 3.6
Deposition rate: 5 $\mu$m./hour at 60° C.
Loss in weight in the alkali resistance test: 0%.

EXAMPLE 2

The procedure described in Example 1 is followed except that glass metal is deposited from the following bath at 60° C. in 2 minutes:
$Ni(NH_4)_2(SO_4)_2.6H_2O$—15 g./lit.
$NiSO_4.7H_2O$—34 g./lit.
sodium acetate.3$H_2O$—15 g./lit.
sodium citrate.5$H_2O$—15 g./lit.
$NaH_2PO_2.H_2O$—50 g./lit.
The pH is adjusted to 4 with sulfuric acid.
Subjecting the fibrous glass coated by this method to alkali resistance test no loss in weight is observed.

EXAMPLE 3

The procedure described in Example 1 is followed except that 90 mg./lit. of benzenesulfinic acid Na are added to the coating bath. Coating is carried out at 60° C. for 3 minutes. Subjecting the coated fibrous glass to alkali resistance test no loss in weight is observed.

Benzenesulfinic acid Na inhibits the decomposition of the solution which involves $H_2$ evolution, and results in a good quality coating.

EXAMPLE 4

The procedure described in Example 2 is followed except that nickel (in the form of $NiSO_4.7H_2O$) and hypophosphite are continuously retrieved. Deposition is carried out on a fibrous glass pulled through the coating bath at a constant speed. Subjecting the coated glass to alkali resistance test no loss in weight is observed.

The coated fibrous glasses obtained by the process according to the invention can be widely used for producing cement- or synthetic-bonded products. In the building industry instead of the conventionally manufactured reinforced concrete elements with a thickness of 80 to 100 mm., 5 to 20 mm. thick elements already provide the desired strength, stability, water-tightness, freezing resistance and abrasive resistance when they are reinforced with a fibrous glass coated according to the invention. The thin crust element obtained can be combined with heat-insulating materials to give sandwich panels, which can be manufactured in numerous different forms and have excellent technical parameters, e.g. heat insulating properties, vapour diffusion, resistance to weather. The fibrous glasses coated according to the invention together with conventional reinforced concrete can be incorporated into a larger variety of reinforced concrete structures, since by their use the formation of cracks can be inhibited and the crack width can be reduced.

Fibrous glasses provided with a glass metal can be equally used for reinforcing cement- and synthetic-bonded materials. In this way elements with very thin wall (5 to 20 mm.) can be manufactured, which have excellent strength, water-tightness, freezing resistance, abrasive resistance, etc. By these thin glass metal elements reinforced concrete elements with a wall thickness of 100 to 200 mm. can be replaced and in this way large amounts of cement can be spared. Transportation costs are also considerably reduced due to the lower weight. These favourable properties make many kinds of applications possible, including front sandwich panels, steady frameworks in reinforced concrete structures, various covering elements, etc.

The fibrous glasses coated with glass metals can be used for reinforcing traditional reinforced metal elements as well.

We claim:

1. A process for coating on a fibrous glass substrate an amorphous glass metal coating consisting essentially of nickel-phosphorus, under conditions free of current, which comprises treating the fibrous glass substrate with an aliphatic alcohol having 1 to 4 carbon atoms, and subsequently with an aqueous solution of $SnCl_2$, in the presence of hydrochloric acid, activating said substrate with a solution of palladium chloride in aqueous hydrochloric acid and keeping it in a bath comprising, as a nickel containing component, nickel ammonium sulfate or a mixture of nickel sulfate and nickel ammonium sulfate, in combination with sodium hypophosphite, an alkali metal salt of at least one organic acid having a low molecular weight, a mineral acid, in an amount sufficient to adjust the pH to 3 to 4, and optionally one or more organic or inorganic metal-deposition regulating agents, at a temperature between 55 degrees Celsius and 70 degrees Celsius.

2. A process as claimed in claim 1, which comprises using a solution containing 0.1 to 0.5 g./lit. of $SnCl_2$ and 0 to 2.0% by volume of a 35% aqueous hydrochloric acid solution for the treatment of said fibrous glass substrate.

3. A process as claimed in claim 1, which comprises using a 0.005 to 0.5% by weight solution of palladium chloride in aqueous hydrochloric acid for activating the fibrous glass substrate.

4. A process as claimed in claim 1, in which the glass metal coating is deposited from a bath having the following composition: 15 to 35 g./lit. of $Ni(CH_4)_2(SO_4)_2.6H_2O$, 10 to 100 g./lit. of sodium citrate, 10 to 100 g./lit. of sodium acetate, 10 to 80 g./lit. of sodium hypophosphite and 5 to 30 $cm^3$/lit. of sulfuric acid having a specific weight of 1.84, at a pH of 3 to 4.

5. A process as claimed in claim 1, wherein said aliphatic alcohol is methanol or ethanol containing up to 20% by volume of water.

6. A process as claimed in claim 1, 5, 2 or 3 which comprises carrying out the activation pretreatment of the fibrous glass substrate at room temperature.

7. A process as claimed in claim 1 or 4, wherein said substrate is kept in the coating bath for 1 to 45 minutes.

8. A process as claimed in claim 1 or 4, wherein maleic acid or benzene sulfonimide salt and/or copper or molybdenum salt is added to the coating bath.

9. A process as claimed in claim 6, wherein maleic acid or benzene sulfonimide salt and/or copper or molybdenum salt is added to the coating bath.

* * * * *